United States Patent [19]

Marks et al.

[11] 3,992,779

[45] Nov. 23, 1976

[54] CHAIN BRAKE FOR CHAIN SAW

[75] Inventors: Michael R. Marks, Shelton, Conn.; James P. Strickland, Jr., Bourbonnais, Ill.

[73] Assignee: Textron, Inc., Providence, R.I.

[22] Filed: May 19, 1975

[21] Appl. No.: 578,414

Related U.S. Application Data

[63] Continuation-in-part of Ser. No. 427,248, Dec. 21, 1973, abandoned.

[52] U.S. Cl. .......... 30/381; 74/97; 188/77 W; 192/81 R

[51] Int. Cl.² .......... B23D 57/02; B27B 17/00; F16D 49/04

[58] Field of Search .......... 188/77 R, 77 W; 192/80, 192/81; 30/381, 382, 383, 384, 385, 386, 387; 74/100, 97

[56] References Cited

UNITED STATES PATENTS

| | | | |
|---|---|---|---|
| 1,179,618 | 4/1916 | Elgert et al. | 188/77 W |
| 1,736,849 | 11/1929 | Douglas | 74/97 |
| 2,754,688 | 7/1956 | Barecki | 74/100 |
| 3,776,331 | 12/1973 | Gustafsson | 30/381 |

FOREIGN PATENTS OR APPLICATIONS

| | | | |
|---|---|---|---|
| 537,413 | 3/1922 | France | 188/77 R |
| 1,185,829 | 3/1970 | United Kingdom | 188/77 R |

*Primary Examiner*—George E. A. Halvosa
*Attorney, Agent, or Firm*—Robert E. Burns; Emmanuel J. Lobato; Bruce L. Adams

[57] ABSTRACT

A brake for quickly stopping the cutting chain of a chain saw in the event of a kickback or other mishap comprises a narrow band of spring steel which wraps at least 1¼ turns around the drum of the centrifugal clutch by which the chain is driven. One end of the band is anchored while the other end is connected to an operating lever which is rotatable between a released position in which the brake band is released from the drum and an applied position in which the brake band is applied to the drum. The operating lever has a peripheral portion which has an interfering engagement with a cooperating portion on a rotatable actuating lever to which a guard or other sensing member is connected. By reason of this interfering engagement the operating lever remains in one or the other of its positions until forcibly moved to the other position by the guard member operating through the actuating lever. The mechanism can thus be set with the operating lever in released position and tripped by force applied to the guard member to rotate the actuating lever and thereby actuate the operating lever to bring the brake band into engagement with the drum. By reason of its wraparound, the brake band thereupon grips the drum so as to bring the drum and hence the cutting chain to a quick stop. A light spring is provided for biasing the operating lever toward the applied position.

21 Claims, 2 Drawing Figures

CHAIN BRAKE FOR CHAIN SAW

REFERENCE TO PRIOR APPLICATION

This application is a continuation-in-part of our co-pending U.S. application Ser. No. 427,248 filed Dec. 21, 1973, now abandoned.

FIELD OF INVENTION

The present invention relates to hand held power driven cutting tools such as chain saws and particularly to a brake for bringing the cutting means of the tool quickly to a stop in the event of a kickback or other mishap.

BACKGROUND OF INVENTION

A chain saw comprises a cutting chain which runs around a peripherally grooved guide bar. The guide bar is ordinarily elongated with a rounded end, but may also be a bow type. The cutting chain is driven by a sprocket which is located at the inboard end of the guide bar and is driven by the chain saw engine acting through a centrifugal clutch. For example, the chain driving sprocket is coaxial with and affixed to or integral with the drum of the centrifugal clutch. When the engine is running at idling speed the centrifugal clutch is disengaged and the chain is accordingly not driven. When the speed of the engine is increased, the centrifugal clutch engages at a selected point so as to drive the cutting chain. When the engine speed is again reduced the centrifugal clutch is disengaged but because of its momentum and the momentum of the sprocket and the drum of the centrifugal clutch, the chain does not immediately stop.

As the cutting chain of a chain saw has teeth with sharp cutting edges and is running at high speeed around the guide bar, it is potentially dangerous. Like any cutting tool, a chain saw must be handled carefully but when properly used it is quite safe. However, if the cutting chain while running should come into contact with the body, it would cause injury. It is therefore desirable as a safety measure to stop the cutting chain quickly in the event the chain saw kicks up or is otherwise displaced so as to bring the guide bar into contact with the body. On the other hand it is desirable not to stop the chain and its driving mechanism so abruptly as to cause damage to the saw itself.

SUMMARY OF THE INVENTION

It is an object of the present invention to provide an improved chain saw brake for stopping the cutting chain of a chain saw quickly and effecively yet not too abruptly. In accordance with the invention as herein described by way of example, the brake comprises a narrow spring steel brake band which wraps at least 1¼ turns and preferably about 1½ turns around the drum of a centrifugal clutch through which the chain is driven. One end of the band is anchored while the other is connected to an operating member which is rotatably supported for movement between a released position in which the brake band is released from the drum of the centrifugal clutch and an applied position in which the band is applied to the drum. Manually operable actuating means normally retains the operating member in released position but if a kickback or other mishap occurs, the means is actuatable to move the operating means to applied position. If this occurs while the drum is rotating, the brake band by reason of being wrapped around the drum for at least 1¼ turns is self energizing to grip the drum and snub it quickly to a stop thereby quickly stopping the cutting chain.

BRIEF DESCRIPTION OF DRAWINGS

The nature, objects and advantages of the chain saw brake in accordance with the present invention will appear more fully from the following detailed description of a preferred embodiment which is shown by way of example in the accompanyng drawings in which.

DESCRIPTION OF PREFERRED EMBODIMENT

Figures 1, 2:
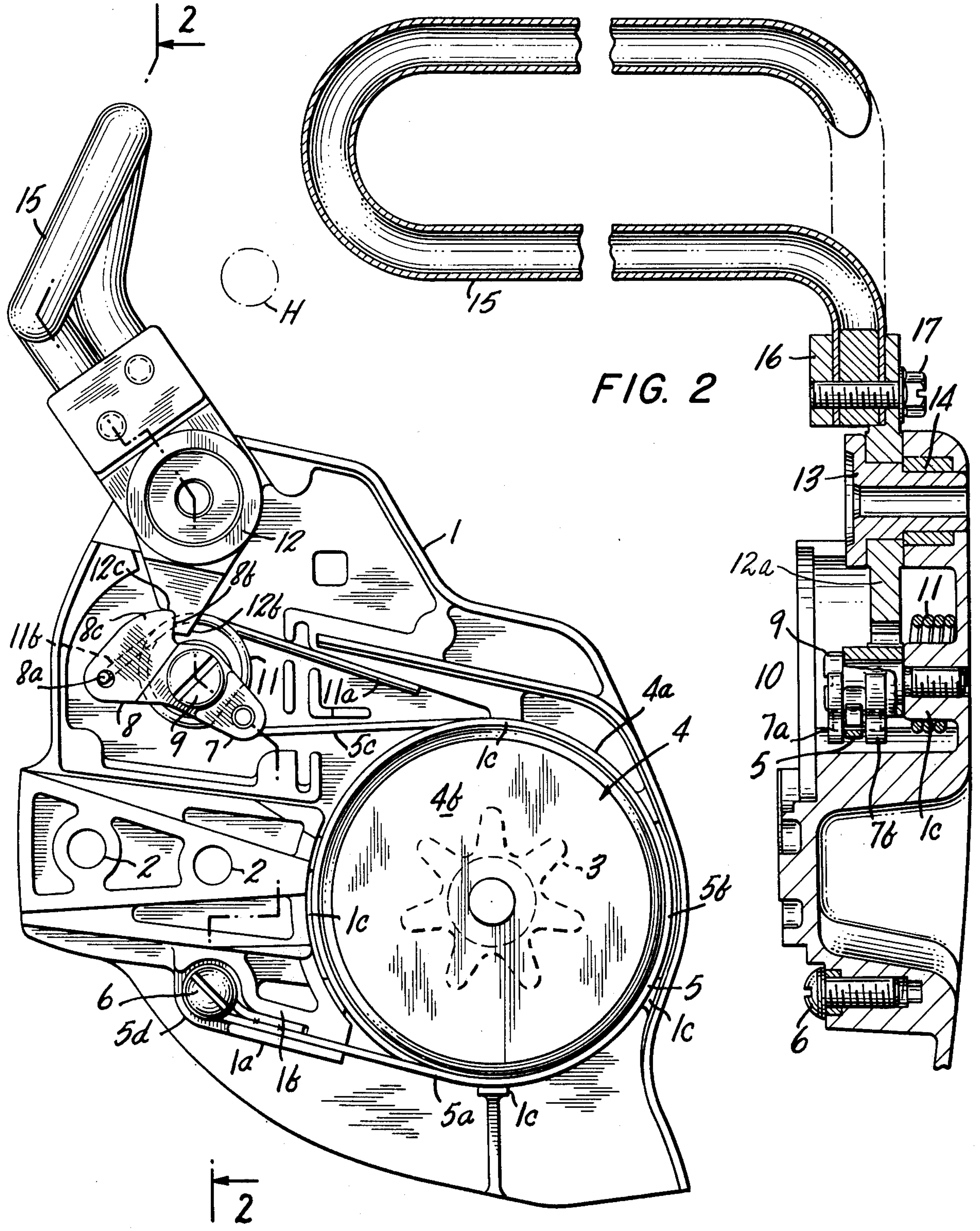
FIG. 1 is a side view of a brake in accordance with the present invention and associated portions of a chain saw.
FIG. 2 is a sectional view taken approximately on the line 2—2 in FIG. 1.

In FIG. 1 of the drawings of a brake in accordance with the present invention is shown installed on the drive case cover 1 of a chain saw. The drive case cover can for example be a suitable casting of the configuration shown in the drawings. A guide bar (not shown) is mounted on the chain saw chassis by bolts passing through holes 2 in the drive case cover. A cutting chain (not shown) which runs on the guide bar is driven by a sprocket 3 on the drum 4 of a centrifugal clutch the expansible rotor of which is driven by the chain saw engine. The centrifugal clutch has the characteristic that when the engine is running at idling speed the rotor is disengaged from the drum so that the drum, sprocket and cutting chain are not driven. When the engine controlled by the usual hand throttle trigger rotates beyond a selected speed, for example 5000 rpm, the centrifugal clutch engages so as to drive the drum 4 and hence the chain. The clutch drum 4 comprises a cylindrical rim portion 4*a* at the periphery of a radial wall portion 4*b* on which the sprocket 3 is mounted. In smaller chain saws the clutch drum may for example, have a diameter of about 2½ to 3 inches with a rim portion about 0.7 inches wide. For larger chain saws the diameter of the clutch drum and the width of the rim are appropriately increased.

A brake band 5 is wrapped around the peripheral rim portion 4*a* of the drum 4 of the centrifugal clutch. The brake band 5 comprises a narrow spring steel band or ribbon which is performed so as to provide a lower straight portion 5*a*, a central portion 5*b* which is wrapped helically around the brake drum and a straight upper portion 5*c*. The lower straight portion 5*a* of the brake band is anchored to the drive case cover 1 by means of a screw 6 which passes through a loop 5*d* formed at the end of the band by bending back an end portion and welding it to the band. Moreover, the loop 5*d* is captured between projecting flange portions 1*a* and 1*b* of the drive case cover 1 so as to be held even if the screw 6 should come loose. The central portion 5*b* of the brake band is formed as a helical coil which surrounds the clutch drum 4. In order to provide proper braking action as hereinafter described, the brake band 5 should make at least 1¼ turns around the clutch drum. It is usually not desirable for the brake band to have more than 3½ turns as otherwise the braking action may be too sudden. Moreover, even the larger clutch drums will not ordinarily accommodate more than 3½ turns. In the construction shown by way of example in the drawings, the brake band wraps around the clutch drum approximately 1½ turns. The brake band is preferably preformed so that the internal diameter of the helically coiled portion 5*b* in relaxed condition is just slightly larger than the external diameter of the clutch drum. However, if desired the helically coiled portion of the brake band in relaxed condition may be somewhat smaller than the clutch drum so that the band tends to grip the drum unless held in an expanded condition. As seen in FIG. 1, the straight end portions 5*a* and 5*c* of the brake band extend essentially tangentially to the clutch drum.

The upper end portion 5*c* of the brake band is connected to an arm 7 of an operating member 8 which is rotatably mounted by means of a shoulder screw 9 screwed into a tapped hole formed in a boss 1*c* of the drive case cover 1. As seen in FIG. 2 the arm 7 is bifurcated with spaced parallel portions 7*a* and 7*b*. A loop formed at the end of the brake band is received between the two portions of the bifurcated arm and is held by pin 10 which passes through the loop and through aligned holes in the arm portions 7*a* and 7*b*. A light torsion spring 11 surrounding the boss 1*c* has one end 11*a* bearing on a portion of the drive case cover and the other end portion 11*b* engaged in a hole 8*a* of the member 8 so as to bias the operating member in a clockwise direction as viewed in FIG. 1. The operating member 8 is notched so as to provide an approximately radial shoulder 8*b* adjacent a peripheral shoulder 8*c*. As seen in FIG. 1, shoulders 8*b* and 8*c* are located approximately opposite the arm 7 to which the brake band 5 is attached.

An actuating member 12 is mounted on the drive case cover 1 for rotation about an axis which is parallel to and spaced from the axis of rotation of the operating member 8. As illustrated by way of example in FIGS. 1 and 2, the actuating member 12 is rotatably mounted by means of a shouldered and headed pin 13 which is press fitted into an annular insert 14 in the drive case cover. Alternatively the actuating member 12 is mounted by means of a shouldered screw screwed into a tapped hole in the drive case cover. The actuating member 12 is manually rotatable by means of a handle or guard 15 comprising a rod or tube bent in loop configuration as seen in the drawings and secured to an arm of the actuating member 12 by means of a fitting 116 and bolt 17. The actuating member 12 has an arm portion 12*a* which extends toward the operating member 8 and has a projecting nose portion 12*b* engageable with the radial shoulder 8*b* and a stepped shoulder 12*c* engageable with the peripheral shoulder 8*c* of the operating member 8. The parts are so located and proportioned that the sum of the radial distance between the shoulder 8*c* and the axis of rotation of the operating member 8 and the radial distance between the shoulder 12*c* and the axis of the actuating member 12 is greater than the normal distance between the axes of rotation of the operating member 8 and the actuating member 12. This results in an interference engagement between the two members so that when the members are in the position shown in FIG. 1 a force of selected value must be exerted on the handle or guard portion 15 to rotate the actuating member 12 in a counter-clockwise direction and thereby rotate the operating member 8 in a clockwise direction so as to cause the shoulders 8*c* and 12*c* to pass through a dead center position defined by a line connecting the axes of the members 8 and 12. As the shoulders 8*c* and 12*c* pass through dead center position, the axes of the members 8 and 12 are sprung away from one another by reason of the sum of the radial distances of the shoulders 8*c* and 12*c* from their respective axes being greater than the normal distance between the axes. This springing of the axes away from one another is permitted by the inherent resiliency of the structure, in particular the resiliency of the drive case cover 1 on which the members 8 and 12 are rotatably mounted. The reaction of the resilient structure resists the springing of the axes of members 8 and 12 away from one another and results in a pressure engagement between the shoulders 8*c* and 12*c* as they are moved through dead center position. Once the projections 8*c* and 12*c* have passed the dead center position, the pressure engagement between them tends to cause the members 8 and 12 to rotate further until the pressure is relieved. To return the members to the position shown in FIG. 1 a force must be exerted on the handle or guard 15 to turn the actuating member 12 in a clockwise direction. The projecting nose 12*b* on the actuating member 12 thereupon engages the radial shoulder 8*b* of the operatng member 8 so as to rotate the operating member in a counterclockwise direction. The interengaging shoulders 8*c* and 12*c* are thereby forced through the center position and come to rest in the position shown in FIG. 1.

By means of the actuating member 12 as described, the operating member 8 is rotatable about its axis between a "released" position in which the brake band 5 is disengaged from the centrifugal clutch drum 4 and an "applied" position in which the brake band engages and grips the drum. In the released position as shown in FIG. 1, the helically coiled portion 5*b* of the brake band is expanded so that there is a slight clearance between the band and the periphery of the centrifugal clutch drum. In this condition the helically coiled portion of the brake band is kept centered with respect to the drum by a plurality of abutments 1*c* provided on the drive case cover 1. The centrifugal clutch drum 4 can thus rotate freely inside the helically coiled portion of the brake band 5. As the interengaging shoulders 8*c* and 12*c* are to the left of the dead center position defined by a line connecting the axes of the operating member 8 and actuating member 12, the operating member and hence the brake band are retained in released position by the interference engagement between the operating member and the actuating member unless and until the actuating member is manually rotated in a counterclockwise direction sufficiently to move the interengaging shoulders 8*c* and 12*c* past the dead center position.

The operating member 8 is thereupon retained in applied position until a force is applied to rotate the actuating member 12 in a clockwise direction to move the interengaging shoulders 8*c* and 12*c* back through the dead center position. It will thus be seen that the operating member 8 is retained, by the interference engagement of the shoulders 8*c* and 12*c* and by the resilience of the structure, either in released position or in applied position and that movement of the operating member from one position to the other requires a force sufficient to overcome the resiliency of the structure which resists the springing of the axes of members 8 and 12 away from one another as the shoulders 8*c* and 12*c* pass through dead center position. The system is thus "bistable" in that by reason of the interference engagement and the resiliency of the structure the operating member 8 is retained in one or the other of its two positions until a force is applied to move it to the other position.

When by means of manual operation of the actuating member 12 the operating member 8 is rotated in a clockwise direction to applied position with the interengaging shoulders 8*c* and 12*c* to the right of dead center, the helically coiled portion of the brake band 5 is contracted so as to engage the centrifugal clutch drum 4. By reason of the band 5 being wrapped helically around the drum, it thereupon grips the drum so as to bring it and the cutting chain quickly to a stop. While the torsion spring 11 biases the operating member 8 in a clockwise direction and assures that the radial shoulder 8*b* of the operating member follows the projection 12*b* of the actuating member when the actuating member is rotated in a counterclockwise direction, it is a relatively weak spring and its force is largely spent by the time the operating member reaches applied position. Hence, the force of the spring 11 in itself would not provide sufficient braking pressure between the brake band and the drum. However effective braking action is obtained by reason of the brake band being wrapped helically around the drum so that it grips the drum when brought into contact.

In the embodiment illustrated in the drawings the guard member 15 extends transversely above the forward portion of the power unit of the chain saw so as to lie in front of and extend somewhat above the forward transverse handle H which is one of the handles by which the chain saw is held during operation. The guard member 15 is normally in the position shown in FIG. 1 and is sufficiently spaced from the front handle H of the chain saw to permit an operator to grip the handle without interference. However, the position of the guard member 15 with respect to the front handle off the chain saw is such that if the chain saw kicks up, the guard member comes into engagement with the hand or wrist of the operator and thereby rotates the actuating member 12 in a counterclockwise direction. The operating member 8 is thereby rotated in a clockwise direction so as to apply the brake and thereby quickly stop the cutting chain. When the brake is applied to the clutch drum the engine is quickly decelerated to the point where the centrifugal clutch disengages. By reason of the brake band beng wrapped helically around the clutch drum for at least 1¼ turns, the brakng action is sufficiently strong to stop the clutch drum and thereby stop the cutting chain whether or not the throttle trigger of the engine is released by the operator. When the chain saw is to be put back into operation, the chain brake is reset to released position by manually rotating the actuating member 12 in a clockwise direction by means of the guard 15. The operating member 8 is thereby rotated in a counterclockwise direction as described above so as to expand the helically coiled portion of the brake band 5 and thereby disengage it from the drum.

It will thus be seen that the present invention provides a chain saw brake which is of simple construction, is reliable and effective in its operation and can easily be reset after it has been tripped. While a preferred embodiment of the invention has been illustrated in the drawings and is herein particularly described, it will be understood that modifications may be made and that the invention is in no way limited to the illustrated embodiment.

What we claim and desire to secure by Letters Patent is:

1. In a chain saw having a clutch comprising a rotatable clutch drum and a chain-driving sprocket driven by said drum, a chain brake for stopping the cutting chain of the chain saw quickly, comprising a brake band wrapped spirally around said drum, means anchoring one end of said brake band, said brake band wrapping around said drum in the direction of rotation of said drum, operating means operably connected to the other end of said brake band and movable between a released position in which said brake band is released from said drum and an applied position in which said brake band is applied to said drum and actuating means normally retaining said operating means in released position and actuatable to move said operating means to applied position while said drum is rotating, whereby said brake band is brought into engagement with said drum to grip and snub the drum quickly to a stop, said operating means comprising an operating member rotatable about an axis parallel to the axis of said drum and having an arm to which said other end of the brake band is connected, and having a peripheral shoulder, said operating member being rotatable through a selected angle between a released position in which said wrapping of said brake band is expanded to release said drum and an applied position in which said wrapping of said brake band is contracted into engagement with the drum, and said actuating means comprising an actuating member rotatable about an axis parallel to the axis of said operating member and having a peripheral shoulder engageable with said shoulder of said operating member, the sum of the radii of said shoulders of said members from their respective axes being greater than the distance between the axes of said members, whereby in movement of said members between released position and applied position said shoulders have an interference engagement with one another to retain said members in the position to which they are moved until a force is applied to move them to the other of said positions.

2. In a chain saw, a chain brake according to claim 1, in which said brake band wraps spirally around said drum at least 1¼ turns.

3. In a chain saw, a chain brake according to claim 1, in which one of said members has a radial projection engageable with a recess of the other member to provide a driving connection for rotation of said operating member by forced rotation of said actuating member.

4. In a chain saw, a chain brake according to claim 1, comprising a guard member connected with said actuating member and manually operable to rotate said actuating member between released and applied position.

5. In a chain saw, a chain brake according to claim 1, comprising light spring means for biasing said operating member toward applied position.

6. In a chain saw, a chain brake according to claim 5, in which said spring means comprises a torsion spring coaxial with said operating member, said spring having one end anchored and the other end connected with said operating member.

7. In a chain saw, a chain brake according to claim 1, in which said actuating means further comprises a guard member connected with said actuating member and manually operable to rotate said actuating member between applied position and released position.

8. In a chain saw, a chain brake according to claim 1, in which said actuating means further comprises a guard member connected with said actuating member and manually operable to rotate said actuating member from applied position to released position and from released position to applied position.

9. In a chain saw comprising a drive case cover, a chain brake according to claim 1, in which said anchoring means comprises means for securing one end of said brake band to said drive case cover and in which said drive case cover includes portions for capturing and retaining said brake band end in event of release of said securing means.

10. In a chain saw, a chain brake according to claim 1, in which said brake band is preformed so that the internal diameter of the spirally wrapped portion of said brake band when in relaxed condition is slightly larger than the external diameter of said clutch drum.

11. In a chain saw, a chain brake according to claim 1, in which said brake band is preformed so that the internal diameter of the spirally wrapped portion of said brake band when in relaxed condition is slightly smaller than the external diameter of said clutch drum.

12. In a chain saw, a chain brake according to claim 1, comprising means for centering the spirally wrapped portion of said brake band with respect to said clutch drum when said brake band is in released position.

13. In a chain saw comprising a drive case cover, a chain brake according to claim 12, in which said centering means comprises a plurality of abutments provided on said drive case cover, said abutments being distributed circumferentially of said spirally wrapped portion of said brake band and being engageable by said brake band when in released position.

14. In a chain saw having a clutch comprising a rotatable clutch drum and a chain driving sprocket driven by said drum, a chain brake for stopping the cutting chain of the chain saw quickly, comprising a brake band wrapped helically around said drum, means anchoring one end of said brake band, said brake band wrapping around said drum at least 1¼ turns from said anchoring means in the direction of rotation of said drum, operating means operatively connected to the other end of said brake band, said operating means comprising an operating member rotatable about an axis parallel to the axis of said drum and having an arm with which said other end of the brake band is operatively connected, said operating member being rotatable about its axis through a selected angle between a brake released position in which said spiral wrapping of said brake band is expanded to release said drum and a brake applied position in which said wrapping of said brake band is contracted into engagement with the drum, actuating means for moving said operating member between said released position and said applied position, and single resilient means acting between said operating member and said actuating means for resiliently retaining said operating member bistably in one or the other of said positions whereby movement of said operating member from either one of said positions to the other requires a force to overcome said single resilient means, said operating member normally being positioned in brake released position during operation of said chain saw, said actuating means being actuatable upon predetermined movement of said chain saw to overcome said single resilient means and move said operating member from brake released position to brake applied position, whereby said brake band is brought into engagement with said drum and by reason of its being wrapped around said drum at least 1¼ turns is self energized to grip the drum and snub the drum quickly to a stop.

15. In a chain saw, a chain brake according to claim 14, comprising means for manually actuating said actuating means, said actuating means being engageable with said operating member when in brake applied position to overcome said single resilient means and move said operating member from brake applied position to brake released position upon predetermined manual actuation means.

16. In a chain saw, a chain brake according to claim 14, in which actuating means comprises an actuating member rotatable about an axis spaced from the axis of rotation of said operating member, said actuating member having a peripheral portion engageable with a peripheral portion of said operating member, the sum of the radii of said peripheral portions from the respective axes of said operating member and actuating member being greater than the distance between the axes of said members, whereby in movement of said members between brake released position and brake applied position said peripheral portions have an interference engagement with one another to retain said members in the position to which they are moved until a force is applied to move them to the other of said positions.

17. In a chain saw comprising a drive case cover, a chain brake according to claim 14, in which said anchoring means comprises means for securing one end of said brake band to said drive case cover and in which said drive case cover includes portions for capturing and retaining said brake band end in event of release of said securing means.

18. In a chain saw, a chain brake according to claim 14, in which said brake band is preformed so that the internal diameter of the spirally wrapped portion of said brake band when in relaxed condition is slightly larger than the external diameter of said clutch drum.

19. In a chain saw, a chain brake according to claim 14, in which said brake band is preformed so that the internal diameter of the spirally wrapped portion of said brake band when in relaxed condition is slightly smaller than the external diameter of said clutch drum.

20. In a chain saw, a chain brake according to claim 14, comprising means for centering the spirally wrapped portion of said brake band with respect to said clutch drum when said brake band is in released position.

21. In a chain saw comprising a drive case cover, a chain brake according to claim 20, in which said centering means comprises a plurality of abutments provided on said drive case cover, said abutments being distributed circumferentially of said spirally wrapped portion of said brake band and being engageable by said brake band when in released position.

* * * * *